United States Patent [19]

Thiebaut et al.

[11] Patent Number: 5,138,607
[45] Date of Patent: * Aug. 11, 1992

[54] METHOD AND DEVICE FOR EVALUATING THE THROUGHPUT OF VIRTUAL CIRCUITS EMPLOYING AN ASYNCHRONOUS TIME-DIVISION MULTIPLEXED TRANSMISSION CHANNEL

[75] Inventors: Georges Thiebaut, Perros Guirec; Denis Le Bihan, Lanmerin, both of France

[73] Assignee: Alcatel Cit, Paris, France

[*] Notice: The portion of the term of this patent subsequent to Jul. 21, 2009 has been disclaimed.

[21] Appl. No.: 540,730

[22] Filed: Jun. 20, 1990

[30] Foreign Application Priority Data

Jun. 20, 1989 [FR] France ............................. 89 08192

[51] Int. Cl.⁵ ........................... H04J 1/16; H04J 3/14; H04J 3/24
[52] U.S. Cl. ...................................... 370/13; 370/94.1
[58] Field of Search ................. 370/94.1, 60, 60.1, 370/13, 17, 84, 94.2; 379/133, 134

[56] References Cited

U.S. PATENT DOCUMENTS

| 4,484,326 | 11/1984 | Turner | 370/94.1 |
|---|---|---|---|
| 4,763,319 | 8/1988 | Rozenblit | 370/84 |
| 4,769,810 | 9/1988 | Eckberg, Jr. et al. | 370/94.1 |
| 4,775,973 | 4/1988 | Tomberlin et al. | 370/94.1 |
| 4,779,267 | 10/1988 | Limb | 370/94.1 |
| 4,799,211 | 1/1989 | Felker et al. | 370/17 |
| 4,896,316 | 1/1990 | Lespanol et al. | 370/94.1 |
| 4,905,231 | 2/1990 | Leung et al. | 370/94.1 |

FOREIGN PATENT DOCUMENTS 0241113 10/1987 European Pat. Off. .

OTHER PUBLICATIONS

Patent Abstracts of Japan, vol. 9, No. 169 (E-238)[1892], Jul. 13, 1985.
Patent Abstracts of Japan, vol. 9, No. 39 (E-297)[17620], Feb. 19, 1985.
French Search Report, Mar. 30, 1990, by Examiner De La Fuente Agua P.

Primary Examiner—Douglas W. Olms
Assistant Examiner—H. Kizou
Attorney, Agent, or Firm—Sughrue, Mion, Zinn, Macpeak & Seas

[57] ABSTRACT

A memory location is assigned to each virtual circuit, this location containing a context (CT) that defines the evaluation conditions for measuring the throughput of the virtual circuit and then, upon reception of each cell, providing for the context relating to the virtual circuit to which the cell belongs to be read. A clock signal is adapted to supply a current time associated with this virtual circuit. An indication of the measuring interval start time is written into the context (CT) for a virtual circuit upon arrival of a first cell for this virtual circuit. Upon the arrival of a subsequent cell for this virtual circuit, the context is read and from the current time (hc) the time interval start time is subtracted. The time difference is compared to a specified measurement interval duration and the number of cells already received is incremented. This number of cells already received is used as a measurement of the mean throughput of the virtual circuit when the time difference is equal to or greater than the duration of the measurement interval. The context is then re-initialized.

19 Claims, 6 Drawing Sheets

FIG. 14

| Selh (4) | ha1 (17) | n1 (11) | T (11) |
| --- | --- | --- | --- |
| ha2 (17) | | | |
| n3 (6) | N (6) | ha3 (17) | |
| Di (17) | c (6) | C (6) | mc (17) |
| Da (6) | | Ds (17) | |
| CPi (20) | | CMAX (20) | Dsa (11) |
| 4×SPi (6) | 4×SMAX (6) | Dsm (11) | |

MEMORY LOCATION

METHOD AND DEVICE FOR EVALUATING THE THROUGHPUT OF VIRTUAL CIRCUITS EMPLOYING AN ASYNCHRONOUS TIME-DIVISION MULTIPLEXED TRANSMISSION CHANNEL

BACKGROUND OF THE INVENTION

The present invention relates to a method and a device for evaluating the throughput of virtual circuits employing an asynchronous time-division multiplexed transmission channel.

An asynchronous time-division multiplexed transmission channel is a transmission channel carrying data messages within digital data structures referred to as cells. Each cell consists of a header made up, for example, by four characters of eight bits and a message body containing a defined number of characters, 32 for example. On the transmission channel, such cells follow each other without interruption. If there is no message to be transmitted, the transmission channel carries an "empty" cell, in other words a cell having the same format as a message cell and carrying conventional information that is readily recognizable. Steps are taken for maintaining a sufficient proportion of such empty cells in the message cell stream; they have the purpose, notably, of synchronizing the receive end to the cell format.

The header of each message cell contains, coded on two characters for example, an item of information that defines, for use by the receive end, the direction in which the message body should be retransmitted. The two other characters of the header contain service information and, notably, code checking and error detecting information relating to the two above characters relating to the destination of the cell. The same information is again encountered in the headers of irregularly spaced cells having the same destination. It thus identifies a sort of virtual circuit occupying part of the transmission capacity of the transmission channel. More generally, this virtual circuit will occupy the transmission channel and will introduce a certain throughput thereinto, measured, for example, in cells by unit of time, and this throughput is subject to fluctuation. The invention has precisely the object of evaluating this throughput.

At any given time, the transmission channel is supporting several virtual circuits the cells of which interfit in irregular fashion into what is commonly called an asynchronous time-division multiplex. The fluctuating throughputs of the various virtual circuits are different. The sum of the throughputs is limited by the maximum throughput of the transmission channel, and this also fluctuates. This leaves space for the transmission of empty cells.

Moreover, the number of virtual circuits which can be separately identified depends on the number of bits allocated to this information in the cell header. The maximum number of virtual circuits is determined for its part, among other things, by the number of virtual circuits obtained by dividing the maximum throughput of the transmission channel by the minimum throughput of a data source able to employ a virtual circuit. This is very high and for example reaches 64 K.

But asynchronous time-division multiplex transmission is intended for the widest areas of application and the bit rates to be catered for from sources able to use a virtual circuit vary over an enormous range of rates (for example from several kilobits to several hundred of megabits per second). The number of virtual circuits that are active will hence in general be less than their maximum number.

An asynchronous time-division multiplexed transmission channel is hence designed for carrying data supplied by sources having varied and fluctuating bit rates. Further along the path to their destinations, switching and transmission equipment route the messages contained in the cells to their destination. A check is hence required, at the level of the transmission channel considered for avoiding the danger of congestion further down the line, that no source, as a result of faulty operation or improper use, is introducing a throughput that is greater than the overall throughput assigned to the circuit. If this does happen, the currently employed corrective action consists in preventing the transmission channel from carrying any cell that is considered as in excess with respect to the throughput globally assigned to the virtual circuit, or at least in marking the excess cell as such, so that it will be rejected further down the line should congestion exist. The present invention relates to a system for evaluating the throughput of virtual circuits which enables such verification to be carried out and excess cells to be thus signaled.

Systems of the type are already known. For example, patent specification FR-A-2 616 024 teaches the use of a clock and a counter provided with one threshold per virtual circuit. The counter steps forward at each cell and back at each clock pulse. If the cell rate becomes greater than the rate of clock pulses, the counter reaches the threshold and provides a signal output.

Such a system is not applicable when the number of virtual circuits is very high and the cell duration is very short (500 ns, for example), the time necessary for causing all the counters to increment following a clock pulse then exceeding the duration of a cell.

The present invention hence has the aim of providing a method and a device for evaluating the throughput of virtual circuits enabling such requirements to be handled. The invention additionally provides further characteristics aimed at giving greater flexibility of use and making it possible to deal with the requirements of the greatest variety of operating situations.

SUMMARY OF THE INVENTION

The method for evaluating the throughput of virtual circuits carrying cells and employing an asynchronous time-division multiplexed transmission channel comprises the use of a memory in which, for each virtual circuit, a memory location is assigned containing a set of data, referred to hereinafter as the context, defining the conditions of evaluation of the throughput of this virtual circuit and providing for, upon reception of each cell, reading of the context of the virtual circuit to which said cell belongs, for the purpose of evaluating the throughput of the virtual circuit, the method further comprising the use of a clock signal adapted to supply a current time associated with this virtual circuit, expressed in a determined unit, it is characterized in that an indication of the start time of a measurement interval is written into said context for a virtual circuit, upon the arrival of a cell for this virtual circuit, and in that, upon the arrival of a following cell for this same virtual circuit, said context is read at the memory location assigned to this virtual circuit, in that from the current time, now supplied by said clock signal, the time of starting the measurement interval supplied by the context as read is subtracted, a time difference being thus established, and in that said context also includes a specified measurement interval duration and a number of cells already received, and that comparison is carried out, upon reception of each cell, of said time difference and said measurement interval duration, and that furthermore said number of cells already received is incremented, as long as said time difference is less than said measurement interval duration, while said number of cells already received is supplied as a measurement of the mean throughput of the virtual circuit, only when said time difference is equal to or greater than said measurement interval duration, at the same time as said number of cells already received and the starting time of the measurement interval are reinitialized.

Such provisions make it possible to evaluate the throughput of the virtual circuit starting from observations made at the arrival of each cell and without any other access to the context than those that are carried out at this occasion, making it possible to process a large number of virtual circuits. Such provisions also make it possible to make measurements economically by chosing a measurement interval of suitable duration whereby the number of cells to be received in the measurement time interval, under nominal traffic, enables the required accuracy to be obtained.

The method according to the invention is further characterized in that an indication of the starting time is also written into said context for a virtual circuit, upon arrival of a cell for this virtual circuit, and in that, upon the arrival of the next cell of the same virtual circuit, said context is read at the memory location assigned to that virtual circuit, and in that from the current time, now supplied by said clock signal, said starting time supplied by the read context, is subtracted, a second time difference being then established and constituting a measurement of the instantaneous throughput of the virtual circuit, defined as the time interval that has occurred between two cells, expressed in said determined unit, in that this instantaneous throughput measurement is supplied to evaluation means, for the purpose of determining the necessity of corrective action, and in that said current time is then recorded in the context as a starting time.

Such provisions make it possible to establish a throughput measurement enabling corrective action to be implemented where a threshold value is crossed, at each cell received, in other words allowing practically immediate action should the throughput suddenly become excessive.

Furthermore, the context includes a count of received cells and this count is adapted to be incremented upon reception of each cell of the virtual circuit, after which the incremented count is compared with a specified count value and, only when said specified count value is reached by said received cell count, said time difference is supplied as a measurement of instantaneous throughput of the virtual circuit, defined as the time interval that has occurred between two non-consecutive cells, while said received cell count is re-initialized.

Such provisions make it possible also to establish an evaluation relating to the average time interval between cells the number of which is defined by said specified count value. The latter value can moreover be included in the context and hence be parametrable.

According to a further characteristic of the invention, provision is made to accumulate several of said throughput measurements successively established for a given virtual circuit and for presenting the accumulated value as a measurement of the accumulated throughput.

According to a further characteristic of the invention, the context includes at least one item of data constituting a throughput counter and that provision is made to modify the content thereof by adding the difference between a determined value corresponding to an authorized throughput, expressed in said determined unit, and one of said throughput measurements, and then for comparing the position reached by this counter for throughput compared to a specified extreme position, and, if this extreme position is reached or exceeded, for the issuing of a signal indicating the need for corrective action.

According to another characteristic of the invention, the context includes at least one throughput threshold and that provision is made for comparing one of said throughput measurements with this threshold and for starting a throughput counter in a first sense, if this threshold is reached or exceeded, or in another sense if this threshold is not reached, as well as for determining that said starting has brought the throughput counter to an extreme position of said first sense, and for then supplying a signal indicating the need for corrective action.

According to a further characteristic of the invention, in the context, a count value and several throughput thresholds are provided and provision is made to compare one of said throughput measurements with these thresholds in order to determine within which interval between thresholds said measurement lies, and for modifying said count value as a function of said determined interval, and further for determining the arrival at an extreme position in a first sense of this count value in order to then supply said signal indicating the need for corrective action.

According to a further characteristic of the invention, the context includes an indication of the authorized maximum throughput and that provision is made for comparing, upon arrival of each cell, the observed throughput with said indication of maximum throughput, and, where said observed throughput reaches or exceed the authorized maximum throughput, for supplying said signal indicating the need for corrective action.

According to another characteristic of the invention, arrival at the extreme position of said throughput counter or said count value gives rise to enforcement within said context of a limiting throughput value dependent upon the associated throughput threshold, fulfilling the same function as said maximum authorized throughput indication.

The device for evaluating the throughput of virtual circuits employing an asynchronous time-division multiplexed transmission channel according to the present invention includes a memory in which, for each virtual circuit, a memory location is assigned containing a set of data, referred to hereinafter as the context, defining the conditions of evaluation of the throughput of this virtual circuit, means providing for, upon reception of a cell, reading the context of the virtual circuit to which this cell belongs, in order to evaluate the throughput of this virtual circuit, together with a clock signal source adapted to supply a current time associated with this virtual circuit, expressed in a determined unit; it is characterized in that it includes means for writing an indication of starting time of a time interval in said context of a virtual circuit, upon arrival of a cell for this virtual circuit, means for, upon arrival of a following cell for this same virtual circuit, reading said context at the memory location assigned to this virtual circuit, means for subtracting from the current time, now supplied by said clock signal, the starting time supplied by the context read, a first time difference being thus established, and in that the context includes also a specified duration of measurement interval and a number of cells already received and in that means are provided for comparing, upon reception of each cell, said time difference and said measurement interval duration, as well as means for then incrementing said number of cells already received, provided said time difference is less than said measurement interval duration, as well as means for supplying said number of cells already received as a measurement of mean throughput of the virtual circuit, only when said time difference is equal to or greater than said measurement interval duration, and at the same time for reinitializing said number of cells already received and the measurement interval starting time.

According to another characteristic of the invention, it includes means for writing a starting time indication in said context for a virtual circuit, upon arrival of a cell for this virtual circuit, means for, upon the arrival of a following cell for this same virtual circuit, reading said context at the memory location assigned to this virtual circuit, means for subtracting from the current time, now supplied by said clock signal, said starting time, a second time difference being thus established and constituting an instantaneous throughput measurement for the virtual circuit, defined as the time interval that has occurred between two cells, means for supplying this instantaneous throughput measurement to evaluation means for the purpose of determining the need for corrective action, and means for then determining writing of said current time into the context, as the starting time.

According to a further characteristic of the invention, the context includes a received cell count and means are provided for incrementing this count upon reception of each cell of the virtual circuit, plus means for comparing the incremented count with a specified count value supplied by the context, and means are provided that only operate when said specified count value is reached by said received cell count in order to supply said time difference as a measurement of instantaneous throughput of the virtual circuit, defined as the time interval that has elapsed between two non-consecutive cells, while said received cell count is reinitialized.

According to a further characteristic of the invention, means are provided for accumulating several of said throughput measurements, successively established for a given virtual circuit, and for presenting them together as a measurement of accumulated throughput.

According to a further characteristic of the invention, the context includes at least one throughput counter, and means are provided for modifying the content thereof by adding the difference between a determined value, corresponding to an authorized throughput, and one of said throughput measurements as well as means for comparing the position reached by this throughput counter with respect to a specified extreme position, then, if this extreme position is reached or exceeded, for issuing a signal indicating the need for corrective action.

According to a further characteristic of the invention, the context includes at least one throughput threshold and means are provided for comparing one of said throughput measurements with this threshold and means are provided for starting a throughput counter, in a first direction, if this threshold is reached or exceeded, or in the other direction, if this threshold is not reached, means being furthermore provided in order to determine that said starting action has brought the throughput counter to an extreme position of said first direction, and then for supplying a signal indicating the need for corrective action.

According to a further characteristic of the invention, there are several throughput thresholds and one count value and provision is made for comparing one of said throughput measurements with these thresholds in order to determine in which interval between thresholds said measurement lies and that provision is made for modifying said count value by an amount which is a function of said determined interval, as well as for determining arrival at the extreme position in a first direction of this count value, and then issuing a signal indicating the need for corrective action.

According to a further characteristic of the invention, the context includes an indication of the maximum authorized throughput and means are provided for comparing, upon the arrival of each cell, the observed throughput with said indication of maximum throughput, and in the case where the observed throughput reaches or exceeds said authorized maximum throughput, for issuing said signal indicating the need for corrective action.

According to a further characteristic of the invention, means are provided for, upon said throughput counter or said count value reaching said extreme position, writing into said context a limiting throughput value which depends on the associated throughput threshold, which fulfills the same function as said authorized maximum throughput indication.

According to a further characteristic of the invention, said clock signal source supplies the current time associated with the virtual circuit via a clock selection module commanded by a clock signal selection indication supplied by said context of the virtual circuit and which selects, as a consequence, a set of outputs of a master clock, the least significant bit output characterizing a determined unit of measurement which is used for measuring the durations involved in the throughput evaluations, this determined unit being selected in order to enable the desired degree of accuracy in these evaluations to be achieved.

This has the result of providing for the time indications employed in relation with a virtual circuit to be adapted to this virtual circuit's own throughput, making it possible to obtain the required accuracy without needing to increase the dimension, in terms of number of bits, of these indications.

BRIEF DESCRIPTION OF THE DRAWINGS

The various objects and characteristics of the invention will be described in detailed in the description which follows, provided by way on non-limiting example and with reference to the attached drawings in which:

FIG. 14 is an illustration of an example of the context suitable for use in the case of an application according to FIG. 13.

DETAILED DESCRIPTION OF THE INVENTION

Figure 1:
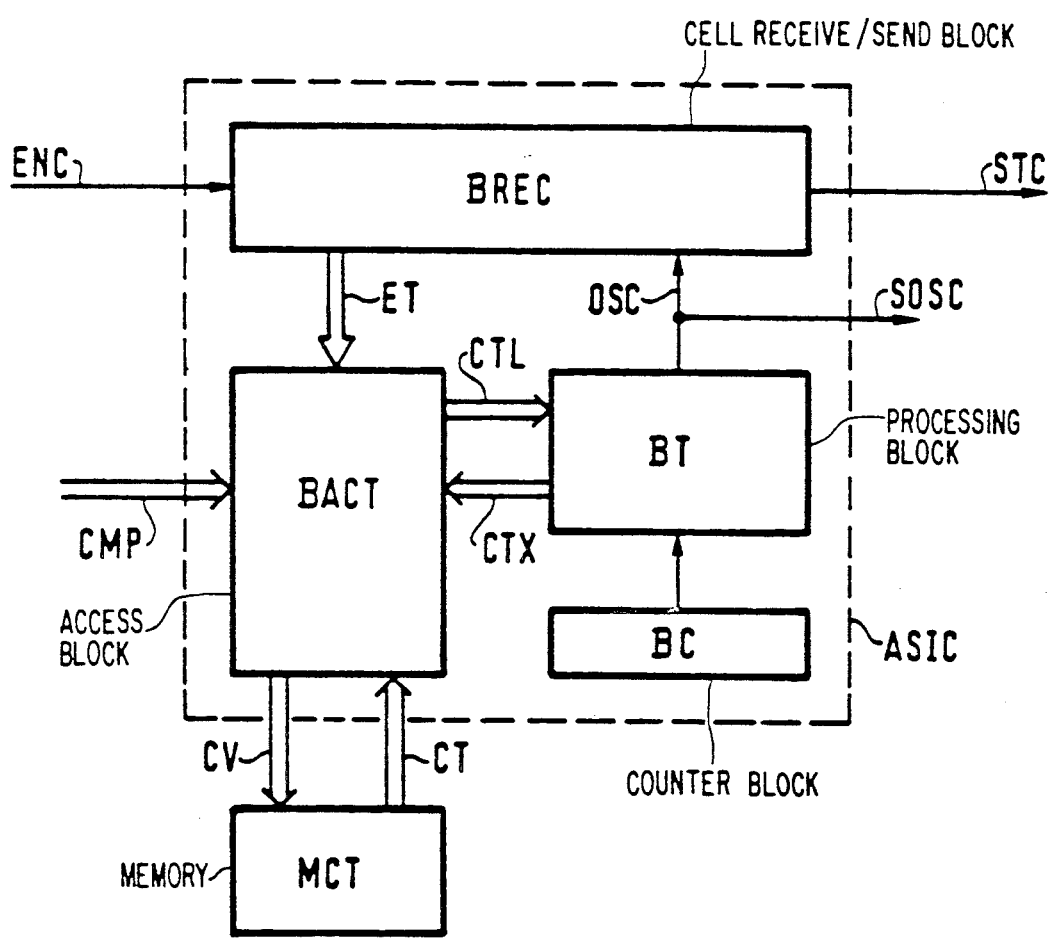
FIG. 1 is a block diagram of one embodiment of the invention.

Reference will first be made to FIG. 1 which is a general diagram of one embodiment of the present invention. The throughput evaluating system in FIG. 1 is interposed between a cell inlet ENC and a cell outlet STC. It is inserted into an asynchronous time-division multiplex transmission channel. To give a better idea, the bit rate of the transmission channel, as received at the inlet ENC, is for example 600 Mbit/s. This data stream passes through a cell receive/send block BREC which can be seen to be a shift register. Provided that the throughputs or bit rates of the virtual circuits supported by the link are acceptable, every cell that is received at the inlet ENC is purely and simply retransmitted onto the outlet STC with a delay which is equal, for example, to the cell transmission time, in other words some 5 μs.

A cell in accordance with the example mentioned in the preamble to the description consists of four header characters; two of these supply a 16-bit virtual circuit number. The cell also includes a message body consisting of 32 characters.

As soon as the header of a cell is available in block BREC, this header, ET, is supplied to an access block to the processing context BACT. Within this block BACT, the virtual circuit number, CV, is used as the address for reading the processing context CT of the virtual circuit to which the cell that was received belongs, in a processing context memory MCT. This processing context CT is a set of digital information some of which is semi-permanent, in other words fixed for the duration of a call carried on the virtual circuit whereas others are modifiable, in other words subject to change upon reception of each virtual circuit cell. This processing context thus contains information which defines the "past history" of the virtual circuit.

The access block BACT supplies the processing context as read, and now called CTL, to the processing block BT which additionally is provided with timestamp information supplied by a counter block BC. On the basis of these two items of information, the processing block BT draws up a processing context, updates CTX which is returned to the access block BACT in order to be re-written at the same address CV, and supplies a signal OSC should the cell received not be acceptable.

The updated context CTX contains modifiable information which may possibly have changed by virtue of the processing program of block BT as a function of the fact that a cell has been received and, above all, as a function of the time the cell arrived which is indicated by the counter block BC.

The signal OSC is transmitted to the block BREC where, in a first embodiment, it produces the effect of replacing the cell received by an empty cell. In a second embodiment, the signal OSC only brings about marking of a flag provided in the cell header; its meaning, in the switching entities through which the cell will subsequently pass, will be that retransmission of the cell is not allowed in the case of overload. Other uses of the signal OSC can be imagined, these being implemented using an output SOSC for the signal OSC.

The time taken by the blocks BACT and BT to carry out the operations that have just been described is advantageously equal to the time taken to transmit one cell, whereby these blocks are subsequently available for a fresh operating cycle as soon as the following cell is received. One could nevertheless, as is well known in the art, arrange for the two blocks to operate such that the context read-processing-rewriting operations on a given received cell overlap with the same operations relating to the cell that follows it, in order for the access block BACT and the processing block BT to each have the whole duration of a cell available for operations relating to this cell.

The context data CT is initially written into the memory MCT by a command processor, which is not shown, that communicates with the access block BACT by a link CMP. On each occasion, the processor supplies a virtual circuit address CV and an item of context information CT. It can be envisaged that the block BACT be, for example, provided with means for identifying empty cells and for it to procede with writing a new context in the time taken to receive each empty cell.

The block BACT will, finally, contain operation monitoring devices and the processor, using link CMP, will read the operating reports contained therein.

Blocks BREC, BACT, BT and BC have been shown enclosed in a box of dashed lines because, for reasons that will become clear later, they can be implemented collectively in the form of an application-specific integrated circuit (ASIC).

Below, we shall provide no further detailed description of the send/receive block BREC which can, essentially, be a shift register, nor of the counter block BC which is generally a simple binary counter incremented by one step at each clock period of an internal clock and passing cyclically through all its positions. The number of stages in this counter will however be discussed later. Detail of the access block BACT will also not be provided since its functions have been clearly defined and its implementation, which is linked to the technology employed for memory MCT, is available to those skilled in the art. The detailed description which follows hence only concerns the processing block BT.

Figure 2A:
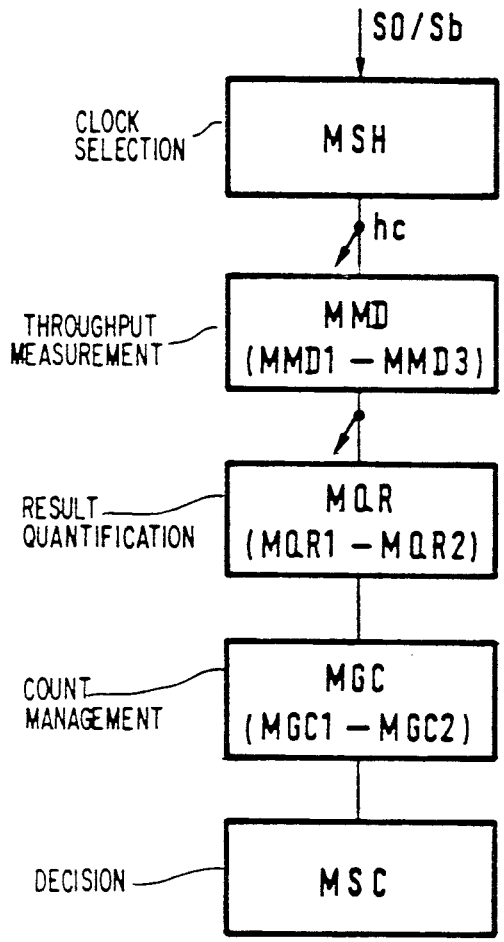
FIGS. 2A and 2B show a block diagram of the processing block BT of the system in FIG. 1.
Figure 2B:
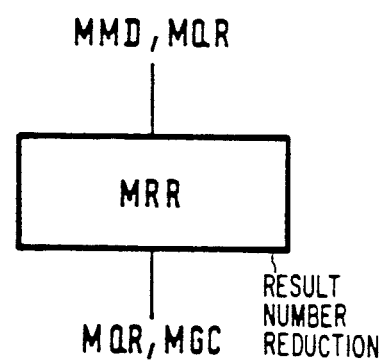

This processing block BT is illustrated in its broad outlines in FIG. 2. It comprises processing modules of six types: at least one clock selection module MSH, at least one throughput measuring module MMD, at least one result quantification module MQR, at least one result number reduction module MRR, at least one count management module MGC and at least one decision module MSC.

Figure 3:
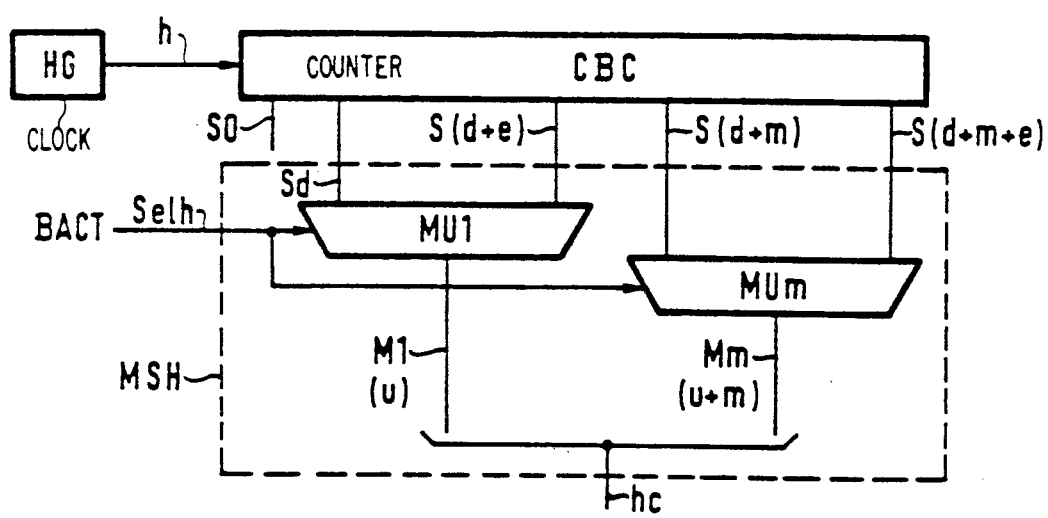
FIG. 3 shows one embodiment of the clock selection module MSH of FIG. 2.

A clock selection module MSH is shown in FIG. 3 which also illustrates the counter CBC of block BC, made up by a succession of binary stages commanded by a clock HG supplying pulses h. The outputs S0 to $S(d+m+e)$ of counter CBC are coupled to the clock selection module which additionally receives, from the context CT supplied by the access block BACT, a clock selection indication selh which is a binary indication able to adopt $e+1$ successive values. This indication is applied to m multiplexers MU1 to MUm which consequently all adopt the same orientation. Each one of these multiplexers is connected to a set of $e+1$ outputs of counter CBC, the m sets being themselves shifted on each occasion by one or several outputs, ranging from multiplexer MU1 up to multiplexer MUm. Multiplexer MU1 is thus connected to the outputs Sd to $S(d+e)$ of counter CBC, while multiplexer MUm is connected to its outputs $S(d+m)$ through $Db=S(d+m+e)$. Finally, outputs M1 to Mm of the m multiplexers supply a present or current time hc in the form of a binary number the significant bits of which vary from u to $u+m$, the significant bit u depending on the value of indication selh. Each virtual circuit is thus able to see itself provided with a clock signal that is appropriate to its throughput or bit rate, defined by the indication selh of its processing context.

It should nevertheless be noted that several clock selection blocks similar to the one that has just been described could be provided together. It will be seen later on that the throughput measuring modules all use a current time which is supplied by a clock selection module. One clock selection module such as the one shown in FIG. 2 is sufficient when a same current time is able to be used for all the measuring modules. It will be readily understood that, in some circumstances, it could be necessary to supply different current times to the various measuring modules; these times would then be supplied by an equivalent number of clock selection modules.

The processing block BT further comprises one or several throughput measuring modules MMD1 to MMD3.

Figure 4:
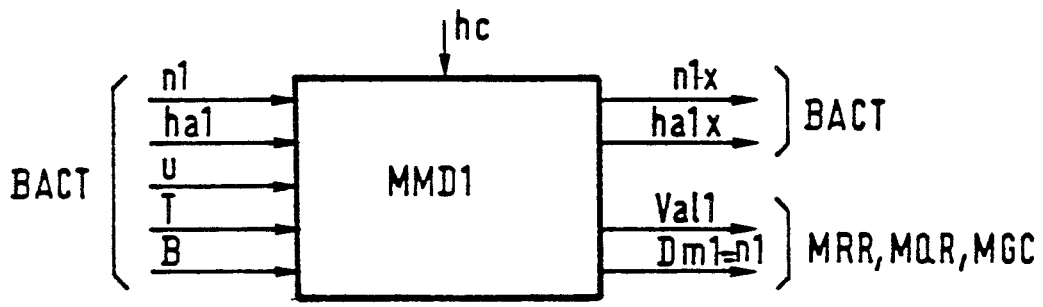
FIG. 4 shows a first embodiment of the throughput measuring module MMD of FIG. 2.

Module MMD1 will first be described with reference to FIG. 4. This module receives from context CT as supplied by block BACT, the following information:
the duration T of a measurement time interval also referred to as T, expressed in periods u,
the value of a period u,
a measuring time interval start time ha1 that is subsequently established on the basis of the current time hc,
the number n1 of cells already received in the current time interval T,
the number B of bits in a cell.

It also receives the current time hc supplied by the module MSH.

Module MMD1 calculates the difference hc-ha1. If this difference is less than T, it only supplies block BACT with a value $n1x=n1+1$, intended to take the place of the value n1 in the context CT. If, on the other hand, this difference is equal to or greater than T, it supplies an enabling signal Val1, accompanying a value $Dm1=n1$, to the module that follows it, MQR, MRR or MGC. It then supplies block BACT with a value n1x 1 and a value $ha1x=hc$ and these are recorded in the context CT as replacements of the values n1 and ha1. Thus, the start time recorded in the processing context CT is the time of reception of an earlier cell for which the value n1 was equal to 1.

The throughput Dm1 thus established at the expiration of each measurement interval of duration at least equal to T should strictly speaking have the value $n1*B/T*u$, equal to the number of bits received per second, if the period u is expressed in seconds. Nevertheless, as has been indicated, $Dm1=n1$ and the measurement result does not contain the factor $B/T*u$. It is hence not necessary for the module MMD1 to receive from processing context CT, the values u and B which are only used for establishing the result. It will be seen below that these factors that are absent from the measuring result are in fact taken into account in the block which makes use of this result. Moreover, it can be noted that the value B can be a constant of the transmission system and that the value T can be a constant of the evaluation system. In this case, they are not supplied by the context CT, but are included in the form of constant values in the modules of processing block BT.

It should finally be mentioned that measurement of the measuring time interval T, although not carried out rigorously, can be sufficiently accurate. In effect, this period of time starts, as indicated, by the time of arrival of a cell and the number of cells already received, set to 1. Following this, the cells are counted until one cell is received for which the difference hc -ha1 indicates that the measurement time interval has been timed out. This latter cell does not make up part of the throughput indication since the end of the measurement time interval has been reached. It will however make up part of the count of the next measurement interval. Hence, all cells are counted. A lack of accuracy originates from the fact that the measurement time intervals are not strictly adjacent. The inaccuracy is at the most equal to one unit in the number of cells counted per measurement time interval. With a sufficiently high number of cells, at the expected average throughput, this lack of accuracy can be negligible.

Thus, the throughput measurement carried out by module MMD1 is hence supplied by a number of cells already received in the measurement time interval, prior to the arrival of the cell under consideration.

Figure 5:
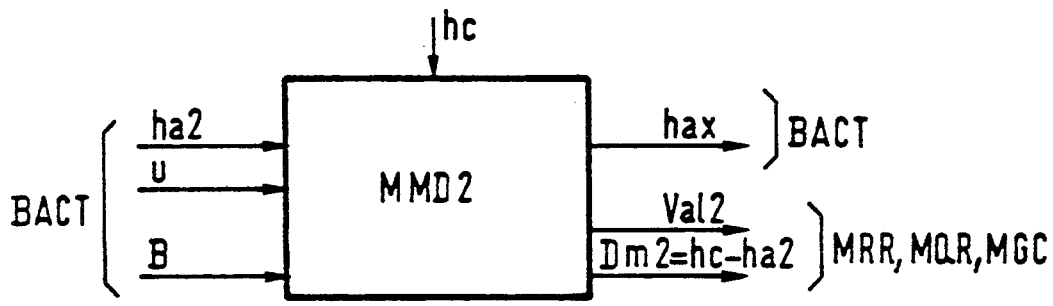
FIG. 5 shows a second embodiment of the throughput measuring module MMD of FIG. 2.

Module MMD2 in FIG. 5 receives, apart from the current time hc originating from clock selection block MSH, the value B as defined above and a value ha2 which now is the current time ascertained when the previous cell was received, these two latter values originating from the processing context CT supplied by block BACT.

Module MMD2 thus establishes, for each cell that arrives, the difference between hc and ha2. It supplies an enabling signal Val2, accompanying a value $Dm2=hc-ha2$, ready for the next module MQR, MRR or MGC. It also supplies block BACT with a value $ha2x=hc$ which is entered into the context CT as a replacement for value ha2.

The expression for the throughput thus established at reception of each cell should rigorously have a value equal to $B/(hc-ha2)*u$, but the factors B and u are not included in the measurement result Dm3; they are taken account of in the next module as will be seen below. Also, value B, as indicated above, can be a constant of the transmission system.

In the case of this module MMD2, throughput measurement is thus directly supplied by the duration of the time interval that has elapsed between the cell which has just arrived and the preceding cell of the virtual circuit under consideration.

Figure 6:
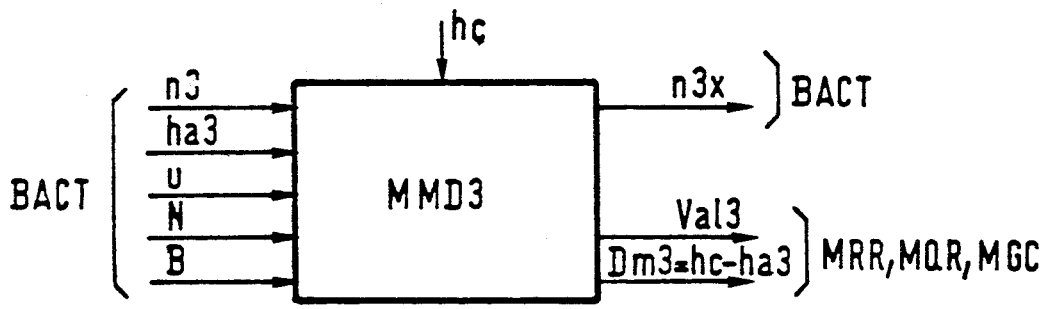
FIG. 6 shows a third embodiment of the throughput measuring module MMD of FIG. 2.

Module MMD3 shown in FIG. 6 receives, apart from the current time hc originating from clock selection block MSH, the previously defined value B, a value ha3 which now is the current time recorded when a first cell of a set of N cells was received, a count n3 which is the number of cells already received of this set of N cells, as well as a value N which the count of the cells in a set should reach, these various values originating from the processing context CT.

Module MMD3 first carries out incrementation of the count n3, n3x = n3 + 1, and then compares the count n3x with the value N. If n3x < N, module MMD3 supplies the count n3x to block BACT for updating the processing context CT (the value ha3 remains unchanged). If n3x = N, block MMD3 calculates the difference hc − ha3. It supplies an enabling signal Val3, accompanied by a value Dm3 = hc − ha3, for use by the next module of the MMR, MQR or MGC type. It also supplies block BACT with a value ha3x = hc and a value n3x = 0 which are recorded in the context CT as replacements for the values ha3 and n3.

The rigorous expression for throughput established in this way upon reception of each cell is as follows:

$$B*N/(hc-ha3)*u,$$

but the factors B, N and u are not included in the measurement result Dm3; they are taken account of in the next module. Also, the value B, as indicated above, can be a constant of the transmission system. As regards the value N, this can be a constant of the evaluation system.

The throughput measurement supplied by module MMD3 is now the duration of the time interval required for receiving N cells. It can also be considered as the average time interval between consecutive cells, evaluated over N cells, multiplied by a constant, which also is N.

The processing block BT further includes at least one result quantification module MQR. This can take the form of module MQR1 illustrated in FIG. 7. This module MQR1 receives an indication of the measured throughput measurement Dm, in other words one of the measurement results Dm1, Dm2, Dm3, originating from one of the preceding modules MMD1 to MMD3, and receives a throughput threshold indication Di originating from the processing context CT. It compares one of these with the other and produces a result signal ROi if the measured throughput value does not reach the threshold value, or a result signal Rli if the measured throughput value is equal to or greater than the threshold. These signals are available either to a subsequent module MRR or go directly to one of the count management modules MGC.

Figure 8:
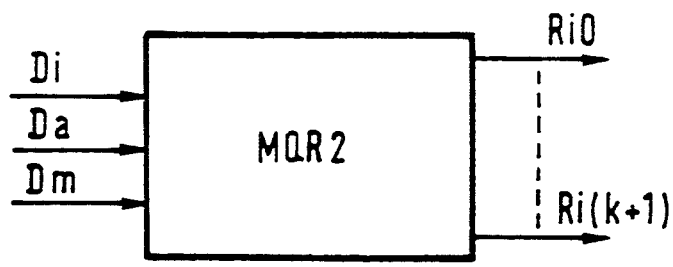
FIG. 8 shows a second embodiment of the result quantification module MQR of FIG. 2.

As an alternative embodiment, the result quantification module MQR can take the form of module MQR2 illustrated in FIG. 8. Apart from the values Di and Dm, module MQR2 also receives, from context CT, a value Da. In module MQR, the values Di and Da are combined in order to supply a threshold indication scale Di, Di + Da, Di + 2*Da ..., Di + k*Da and the value Dm is compared with this set of threshold values whereby the module produces a result signal Ri0 only if the lowest threshold value is not reached, signal Rli if threshold Di is exceeded, but none of the thresholds following it, and so on, result signal R(k+1)i being supplied only when the highest threshold value Di + K*Da is exceeded. These signals are available either to modules for reducing the number of results MRR or directly to the count management modules MGC.

In the module MQR2, as an alternative embodiment, it is still possible for the various values of the threshold indication scale to be directly supplied by the context.

Figure 9:
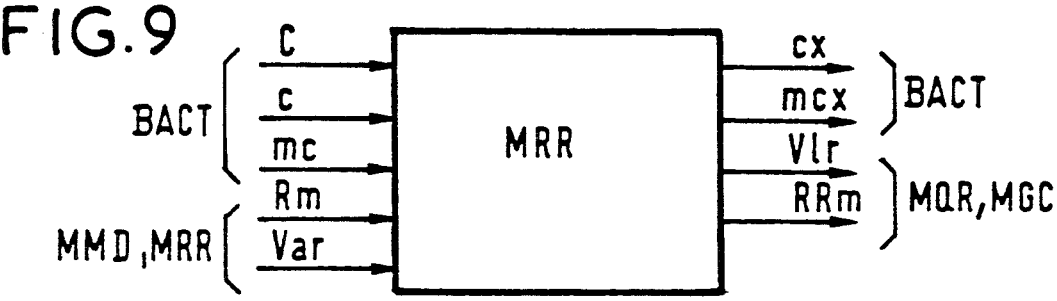
FIG. 9 shows an embodiment of the result number reduction module MRR of FIG. 2.

The module for reducing the number of results MRR is an optional element. An MRR module can follow a throughput measuring module MMD1 to MMD3, or yet again a result quantification module MQR. One embodiment of such a module is shown in FIG. 9. The function of this module is to accumulate a certain number of measurement results whether quantified or not. It receives the following values from the processing context CT:

The number C of measurement results required to be accumulated, the number c of measurement results already accumulated, mc the cumulative value of the c measurement results already acquired.

It moreover receives a measurement result Rm which is the measurement result Dm1, Dm2 or Dm3 supplied by the preceding throughput measurement module, or the result signal Ri0, Ri1 ..., Ri(k+1) supplied by the preceding result quantification module. It finally receives an enabling signal Var which is the signal Val, Va2 or Val3 from the measuring module from which the measurement result originated.

In exchange, this reducing module MRR draws up a number cx = c + 1 and compares it with the number C. At the same time, the module calculates the sum mcx = mc + Rm. If cx < C, the number of results needed to be accumulated has not yet been reached and the module MRR supplies, in order to update the processing context CT, the values cx and mcx. When cx = C, the module MRR supplies the context with cx = 0 and mxc = 0, whereas to the next block, which can be a result quantification block MQR or a count management block MGC, it supplies an enabling signal V1r and a measurement result signal RRm = mc, these two items of information having the same meaning, as regards the next block, as the items of information Val and Dm from the throughput measurement modules MMD1, MMD2, MMD3.

We shall now describe two successive versions of the count management modules MGC. The first version, MGC1, shown in FIG. 10, typically applies in the case where the throughput is measured using throughput measurement module MMD1 or where there is a module for reducing the number of results MRR employed in relation with such a measuring module. This version employs the throughput value Vm directly (in other words Dm1 or RRm), supplied by this module, upon reception of a cell, when the corresponding validation signal Valv (in other words derived from validation signals Val1 or V1r,—how this is done will be explained below) is present. Moreover, module MGC1 receives, from block BACT, a throughput threshold value Ds, a minimum throughput value Do, a throughput counter position CPi, a maximum counting threshold indication CMAX and a minimum counting threshold indication CMIN, these information items being supplied by the context CT and being all expressed in the same unit, which, in this case, is the number of cells. The minimum counting threshold can have a value 0. In this case, it is not supplied by the context.

Module MGC1, in this first version, compares the value Vm with the throughput value Do. If $Vm < Do$, no action is carried out and the context information is left unaltered. Where Vm is greater than or equal to Do, the count CPi is increased by Vm and decreased Ds, giving the count result CPx which is then compared with the value CMAX. If $CPx > CMAX$, the result is modified to $CPx = CMAX$ and this is recorded in the context CT. This means that if the throughput is greater than a minimum value, in other words outside periods of "silence", and if the throughput evaluated by this counter is lastingly less than the threshold throughput Ds, counter CPi reaches the value CMAX and remains there, which corresponds to a limited "credit" for possible subsequent situations where the threshold is exceeded. In parallel with this, the result CPx is compared with the value CMIN. If $CPx < CMIN$, the result is modified to $CPx = CMIN$. The OSC1 instruction is then issued. Together with other instructions from similar modules, this instruction supplies the signal OSC (see description relating to FIG. 1). This means that if all possible credit has been consumed, the threshold throughput Ds has been exceeded. The cell that gave rise to processing should be marked as being in excess and give rise to corrective action. Instruction OSC1 is additionally recorded in the context. It will be seen below that this makes it possible to reduce possible exceeding of the throughput from being carried over into the next measurement period. Finally, in the case where $CMAX < CPx < CMIN$, the value CPx becomes the value CPi in the context CT, without there being any other action.

This same count management module that has just been described can obviously give rise to a corresponding variant in the case where the measurement value Vm is supplied by one of the throughput measurement modules MMD2 or MMD3, or by a module for reducing the number of results MRR employed in relation with one of these modules. The information supplied to the count management module is then made up by units of duration defined by the selected clock signal.

Module MGC1, in this variant of the first version, compares the value Vm with the throughput value Do. If $Vm > Do$, no action is taken and the context information remains unchanged. Where $Vm < Do$, the count CPi is decreased by Vm and increased by Ds, which supplies the count result CPx which is then compared with the value CMIN. If $CPx < CMIN$, the result is modified to $CPx = CMIN$ which is recorded in the context CT. This means that, if the throughput is greater than a minimum value, in other words outside of periods of "silence", the intervals between cells being less than a minimum value, and if the throughput evaluated by this counter is lastingly less than the threshold throughput Ds, counter CPi reaches the value CMIN and remains there, which corresponds to a limited "credit" for possible later exceeding of the threshold. In parallel with this, the result CPx is compared with the value CMAX. If $CPx > CMAX$, the result is modified to $CPx = CMAX$. Instruction OSC1 (see above) is then issued. This is also recorded in context CT. This means, all possible credit having been consumed, that the threshold throughput Ds has been exceeded. The cell that gave rise to processing should be marked as being in excess. To finish, where $CMAX < CPx < CMIN$, the value CPx becomes the value CPi in the context CT, without any further action.

Figure 7:
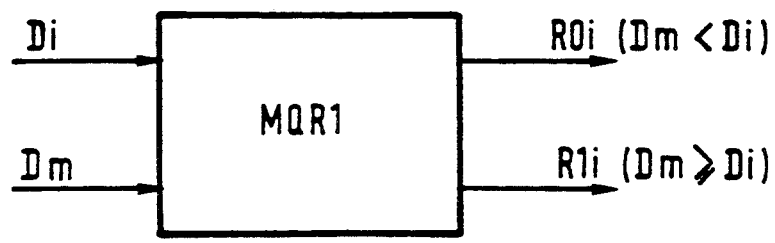
FIG. 7 shows a first embodiment of the result quantification module MQR of FIG. 2.

We will mention only one third variant of the count management module MGC1, this being the one that handles the information supplied by a result quantification module of type MQR1 shown in FIG. 7. This variant is in effect substantially similar to the first two with the exception that the throughput counter moves forward or back by one step depending on whether crossing of the threshold Di supplied to module MQR1 occurs or not.

Figure 11:
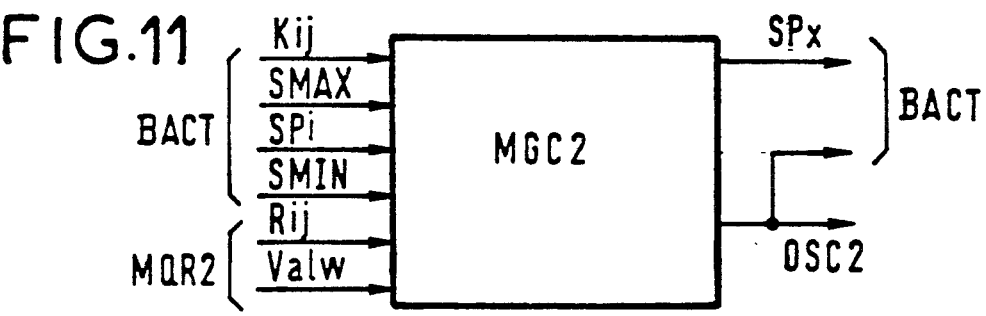
FIG. 11 shows a second embodiment of the count management module MGC of FIG. 2.

The second version of the count management module, MGC2, is shown in FIG. 11. It is used where the measurement is supplied by a result quantification module such as module MQR2 illustrated in FIG. 8. It will be recalled that at each cell, module MQR2 supplies, for different threshold values, an indication Rij (i=threshold value scale; $j = 0 \ldots, (k+1)$) characterizing the exceeding of the threshold, in other words the fact that the measurement value is located in the interval between a threshold j and the next threshold $j+1$. The value Rij corresponding to one of these thresholds is supplied to the count management module MGC2, accompanied by an enabling signal valw, which in fact is the enabling signal supplied by the measurement module from which the quantified measurement result originated, at the same time as a count value SPi established upon reception of a preceding cell as will be seen below, a maximum counting threshold value SMAX, a minimum counting threshold value SMIN, as well as a counting scale Kij.

The counting scale Kij is a set of counting values and each value Rij corresponds to one of these values.

Depending on the item of information Rij, one of the counting scale values Kij is activated and this value (which can be positive or negative) is added to the count value SPi. Following this, the modified value SPx is compared to the maximum threshold SMAX. If $SPx > SMAX$, instruction OSC2, similar to instruction OSC1 (see above) is issued. In parallel with this, the modified value SPx is compared to the minimum threshold SMIN. If $SPx < SMIN$, the value SPx is limited to $SPx = SMIN$. No other action is carried out.

The same indication Rij supplied by a result quantification module can be communicated to several count management modules MGC2, having differing counting scales. This makes it possible to evaluate virtual circuit throughput using differing criteria.

The counting scale Kij can be a constant of the evaluation system and in this case, it is not supplied by the context but rather written in the module MGC2. In accordance with one variant, several separate counting scales are written into the module MGC2; the item of information Kij designates one of these scales, and is used, in module MGC2, for selecting and implementing this scale.

Whichever of the count management modules is considered, appearance of an instruction OSCi, corresponding to OSC1 or OSC2, will further advantageously have the effect of partially inhibiting updating of the processing context CT. For the MMD2-type module, this will forbid replacement of the start time ha2 by the current time hax. This will have the consequence that for this module, the cell that gave rise to corrective action will be considered as never having existed. It can also be provided for that the counter(s) of the count management module(s) are no longer updated. Consequently, every excess cell is eliminated thus bringing the virtual circuit to an acceptable throughput. More generally, no updating at all of the processing context CT can be introduced. The cell that gave rise to corrective action is then considered as not having been received by the evaluation device.

Figure 12:
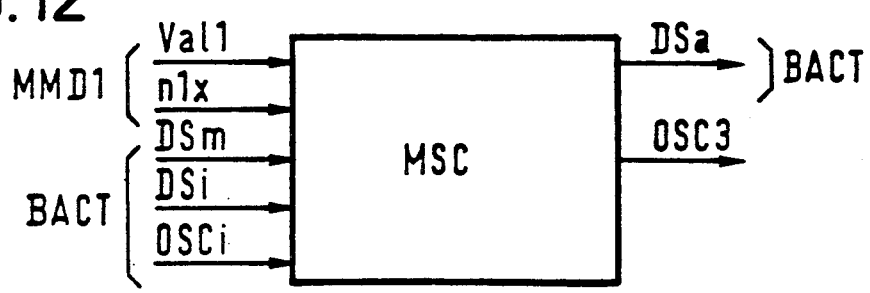
FIG. 12 shows an embodiment of the decision module MSC of FIG. 2.

We shall now describe, with reference to FIG. 12, the immediate correction module MSC. This module supplements module MMD2 and the modules that follow it, in order to handle situations of excessive throughputs. From module MMD1 it receives, upon each cell arriving, the value n1x of the number of cells received in the current measurement interval. It also receives therefrom enabling signal Vall, at the end of each measurement interval. From the context CT, it receives a maximum threshold value Dsm, intermediate threshold values Dsi, and signals that correspond to the corrective action instructions OSCi from the count management modules associated with the throughput measurement module MMD1, previously recorded in the context CT as indicated above.

Upon each cell arriving, the observed throughput, reflected by the number n1x of cells already received in the measurement time interval, is compared with the maximum threshold value Dsm. If n1x>Dsm, instruction OSC3 is issued. This produces instruction OSC for setting off corrective action relating to the cell that arrived. Thus, when a maximum number of cells have been received, and processed normally, in a measurement time interval, the ones that follow are all simply considered as being in excess. It is thus possible to allow arrival of cells that are close together and hence at a high instantaneous rate, but in a limited number, which do not get rejected by virtue of the measurements carried out by the modules MMD2 and/or MMD3 while still forbidding, if the high rate persists, carrying of cells that exceed the maximum threshold defined for the relatively long duration of the measurement time interval. Such provisions are not applied to the reception of the last cell of a measurement time interval when signal Vall is present.

As was the case above, provision can be made whereby, the received cell having been rejected, context updating is forbidden so that all subsequently received cells, up to the end of the measurement period, are also rejected (except the first cell received after the end of the measurement time period).

Moreover, module MSC, when it receives instruction OSC from the context, issued by one of the count management modules handling the measurement result supplied by module MMD1, selects a corresponding intermediate threshold value Dsi supplied by the context CT. The number of cells n1x is also compared with this threshold in order to produce instruction OSC3 if the threshold is exceeded. This happens notably, after the end of a measure interval, when the number of cells received, and all credit having been exhausted, has finally exceeded a prescribed threshold. The provisions described above relating to the maximum threshold will have ensured that only limited threshold exceeding occurs. Implementation of an intermediate threshold discussed here aims at limiting possible fresh exceeding of the threshold at an even lower level that is a function of the level which gave rise to recording of the relevant instruction OSCi.

Provisions which will not be described make it possible to delete OSCi instructions from the context at the end of the next measurement period if the corresponding exceeding condition has not re-occurred.

In accordance with the invention, a module similar to module MSC of FIG. 12 can also by provided in relation with a module MMD2 or MMD3. It is unnecessary to give a detailed description since this derives directly from what we have just discussed.

Figure 13:
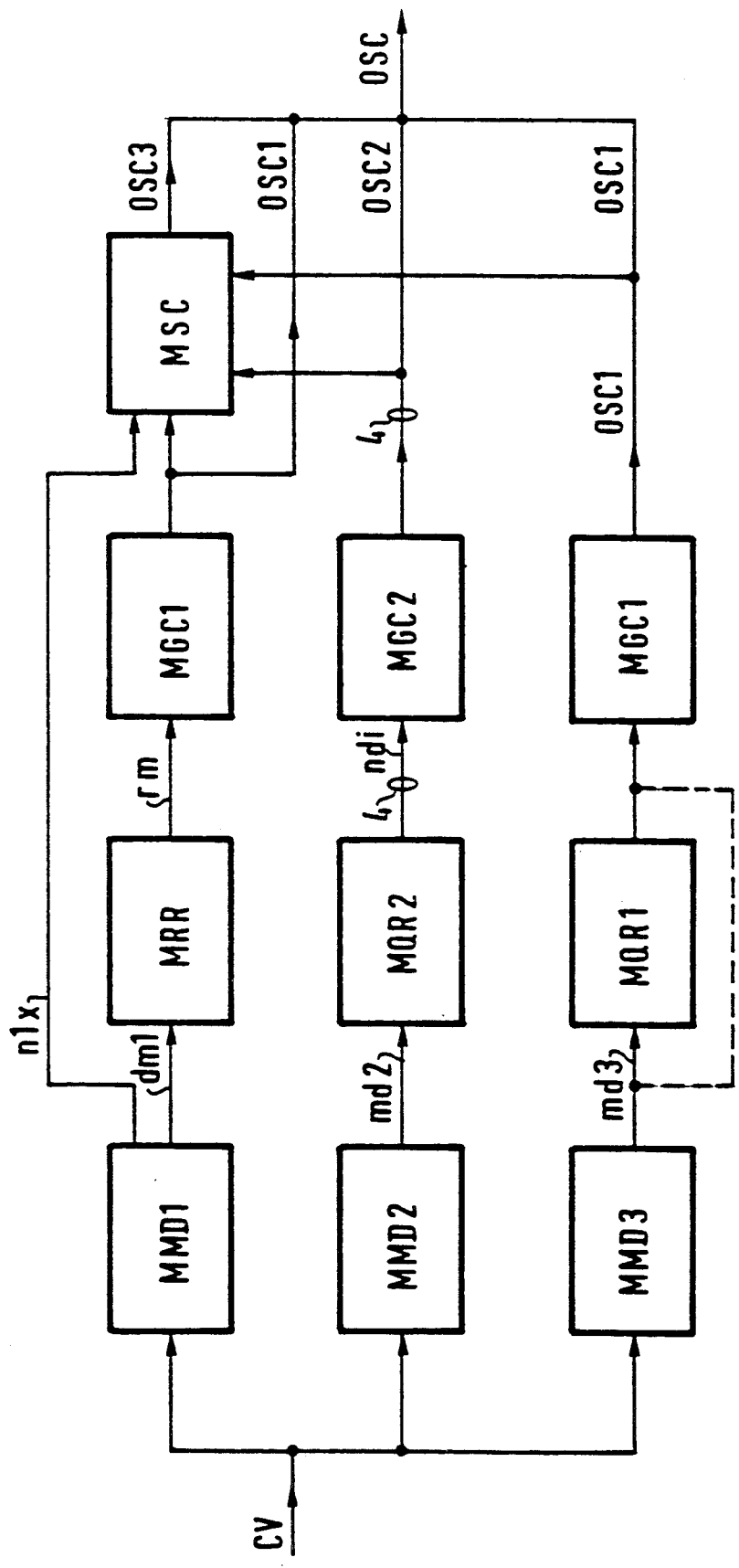
FIG. 13 is a diagram illustrating the functional assembly of the modules of the block BT for processing a particular virtual circuit constituting one case where the present invention is applied.

An overall description of processing block BT will now be provided with reference to FIG. 13 which illustrates one application of the invention in which, for a given virtual circuit CV, use is made, in the block BT of FIGS. 1 and 2, of one each of modules MMD1, MMD2, MMD3, MRR, MQR1, MQR2, MGC2 plus two MGC1 modules, as well as one MSC module.

Upon arrival of each virtual circuit cell, module MMD2 supplies a throughput measurement MD2 which includes an enabling signal Va12 and the throughput value Dm2 illustrated in FIG. 5. This value is the duration which separated this cell that arrived from the preceding cell of the same virtual circuit. It is supplied to a result quantification module MQR2. In the latter, it is compared to thresholds supplied by the context and which take account of the conditions in which throughput measurement was established, notably the clock period u in which measurement was expressed. Module MQR2 supplies output signal ndi, which includes result signals $Ri0 \ldots, Ri(k+1)$ of FIG. 8, defining throughput levels, to a count management module MGC2. The count value of this module evolves, for each observed throughput level, in accordance with the counting scale and the counting range in this counter thus defines a tolerance in the exceeding of thresholds. Persistent exceeding brings about the sending of a reject instruction OSC2.

Figure 10:
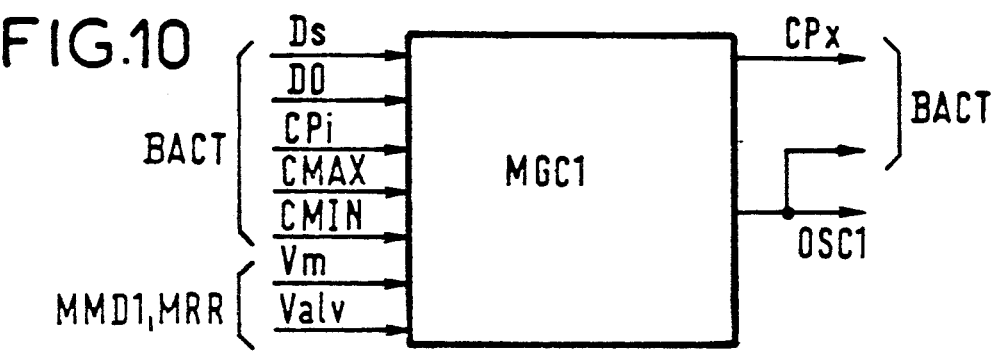
FIG. 10 shows a first embodiment of the count management module MGC of FIG. 2.

At the same time, module MMD3 counts arrival of a cell and, if the count indicated by the context is attained, it supplies a throughput measurement md3 to an MGC1-type counting management module, conforming to FIG. 10, optionally preceded by a result quantification module such as module MQR1. This throughput measurement includes the enabling signal Va13 and the throughput value Dm3 of FIG. 6, which in fact is the duration of the time interval that separated the cell that arrived from an Nth previous cell on the relevant virtual circuit. This throughput value is added to the content of the throughput counter managed by module MGC1 while a value corresponding to the authorized throughput is subtracted therefrom. This latter value is also supplied by the context and takes account of the conditions under which throughput measurement was carried out, notably the duration of the clock period in which measurement was expressed. In fact, the counter adds a value that corresponds to the difference between the authorized throughput and the observed throughput, in other words the deviation with respect to a prescribed throughput, and this deviation relates to the mean time interval evaluated over a set of N cells. Such deviations thus cover longer periods than those evaluated on the basis of measurement module MMD2 and mask throughput spikes appearing on two or three cells that are very close to each other. Finally, persistent exceeding of throughput brings about issuing of instruction OSC1 and hence of signal OSC, as indicated above.

Still at same time, module MMD1 counts arrival of a cell within the measurement time interval. If the measurement time interval has expired, the number of cells received in this measurement interval is transmitted as the measurement result dm1 comprising enabling signal vall and the throughput value dm1 of FIG. 4. Several such results of measurement are accumulated by module MRR. If the end of accumulation is reached, module MRR supplies a measurement result rm including enabling signal Vlr and the measurement result value RRm of FIG. 9, to an MGC1-typE count management module. The operation of the latter has already been discussed. Here again, the value subtracted is defined taking account of the throughput measurement conditions. This leads, where there is persistent exceeding of throughput, to a reject instruction OSC1. The combination of the measurement time interval defined in module MMD1 and of accumulation module MRR makes it possible to provide an evaluation of throughput covering a relatively long period, and consequently of high accuracy. Using the same measurement module MMD1 and different MRR accumulation modules, several different measurement results can be obtained which relate to different periods of accumulation.

Moreover, module MSC receives the number of cells n1x received in the measurement time interval and compares it with thresholds as indicated, in order to supply reject instruction OSC3 where the throughput is excessive. It also receives reject instructions OSC2 and OSC1 from modules MGC2 and MGC1, in order to establish limiting throughput values that also serve for rejecting cells of a virtual circuit in the case of persistent excess throughput thereon.

To conclude, we shall describe with reference to FIG. 14, an example of context CT which can correspond to the case of the application shown in FIG. 13.

FIG. 14 illustrates a memory location subdivided into spaces each represented by a rectangle and containing the number of bits indicated between brackets in the lower right hand corner. Here, values and other indications mentioned in the description of the modules of FIGS. 3 to 12 will be found.

The indication of clock selection selh takes up 4 bits. This makes it possible to select one clock signal out of 16. If a current time of the clock comprises 17 bits, the counter CBC can comprise up to 32 bits.

The number of bits of the current time supplied by the clock, and indications of starting time recorded in the contexts, is determined by the problem posed by temporally inactive virtual circuits. The situation must not occur where, the clock of a virtual circuit having accomplished a full cycle without any cell having been received, a reject decision is taken where in fact throughput is extremely low. One solution would for example consist in imposing a minimum throughput on the sources that are connected without which, the connection would be broken off. This would lead to an artificial throughput. It would be all the smaller as the virtual circuit clock cycle increased, in other words as the number of bits in the current time was increased.

For the needs of module MMD1, the start time ha1 comprising 17 bits, is then encountered followed by the number n1 (11 bits) of cells already received and the number T (11 bits) of clock periods defining the duration T of the measurement time interval.

If the average nominal throughput of the virtual circuit considered is 2 Mbit/s, the least significant bits of the clock signal associated with the virtual circuit and selected by indication selh can have a period of 8 $\mu$s, while the average interval between cells is 150 $\mu$s for cells of about 300 bits. A measurement time interval covering reception of an average of 100 cells should be of at least 15000 $\mu$s, i.e. about 2000 clock periods. We thus find the value of 11 bits needed for defining the indication T. On the other hand, the number of bits needed to count the number of cells received in the measurement time interval should correspond to the maximum number of cells that are acceptable in such a period, starting from an average throughput which could be expressed by a 8-bit number. The number n1 provided is thus of 11 bits, corresponding to a maximum possible throughput of some 20 times the average throughput. The thresholds Dsm and Dsa necessary for decision module MSC consequently have the same number of bits (11).

Indications ha2 and ha3 needed for modules MMD2 and MMD3 have 17 bits and are derived from the same clock signal. Measurement of the time interval between two consecutive cells is thus carried out to around 5%. Since the aim is to forbid the highest and most brief throughput spikes, such a lack of accuracy can be accepted. Accuracy can be obviously better for measurements carried out by module MMD3. For the requirements of this module MMD3, the context moreover supplies values for the number n3 (6 bits) of cells received and for the number of cells to be received N (also 6 bits). It is thus possible to measure the average time interval between from one to 63 cells. The similar values c and C needed by the module for reducing the number of results MRR also have 6 bits each, and provide the same possibilities. The cumulative value mc of module MRR will hence have 11+6=17 bits.

Threshold Di and the threshold increment Da needed by result quantification modules MQR1 and MQR2 have respectively 17 and 6 bits. The time difference hc−ha3, or hc−ha2, can have 17 bits. It will thus be compared to thresholds of 17 bits, spaced by a number of 6 bits.

Threshold Ds needed by module MGC1 consists of 17 bits, since the cumulative value supplied by module MRR consists of this same number of bits. Threshold Do is here considered as being zero. The counter CPi that is controlled by this module has 20 bits. The value CMAX also consists of 20 bits. The value CMIN can be zero or constant and, consequently, not be present in the context.

Count values SPi have have also been mentioned (4 values each of 6 bits) and associated SMAX thresholds (4 thresholds each of 6 bits), the thresholds ᴄ.,iIN being also supposed to be zero or constant. Finally, the context shown in the figure also includes a maximum threshold value Dsm having 11 bits and an applicable threshold value Dsa, also of 11 bits, for the needs of the immediate reject decision module MSC of FIG. 12.

A similar virtual circuit having a mean nominal throughput of 4 Mbit/s would be processed in exactly the same manner, with only the clock signal specific to this virtual circuit differing. A virtual circuit the mean throughput of which is situated between 2 and 4 Mbit/s would be processed with the clock signal of a 4 Mbit/s virtual circuit, but with appropriate adjustment of the parameters determining throughput evaluation, in other words the period T (which would be shorter) the thresholds Di of modules MQR1 or MQR2 (which would be higher) or the value Ds of module MGC1 (which would be lower in the case of FIG. 13).

Moreover, a virtual circuit having the same mean nominal throughput could be considered as allowing more or less pronounced throughput spikes. In practice, this would involve using different threshold values Di an Da for modules MQR1 and MQR2. The arrangement of the modules could also be modified as was indicated during description of these.

The approach has thus been amply illustrated. The values which have not been described and which would be necessary are added in the same manner; others can be considered as constant, or can be selected from a small number of constants, which can allow the dimensions of the context to be reduced. Those skilled in the art are aware of coding techniques which enable, at the price of a slight increase in circuit complexity, a considerable saving to be made in the volume of data to be stored in memory.

The practical implementation of the throughput evaluation device according to the invention does not pose a technical problem to the extent where the various parts thereof, as described, carry out simple arithmetic and logic operations. As indicated in FIG. 1, the combination of blocks BREC, BACT, BT and BC can be implemented in the form of a single ASIC component, i.e. in integrated circuit form. Memory MCT containing the context, at the present state of the technology, would be a separate component. The modular design of processing block BT makes it easily adaptable to the various applications envisaged. The case of the application illustrated in FIG. 13 is only one example and other configurations are possible. Such separate configurations could all be obtained starting from the same integrated circuit by providing it with a sufficient number of modules of various types and configuration means (registers and configuration switches), which for example are accessible via link CMP making it possible to set up a whole variety of different module configurations such as the one shown in FIG. 13.

What is claimed is:

1. A method for evaluating the throughput of virtual circuits carrying cells and employing an asynchronous time-division multiplexed transmission channel, said method comprising:

assigning, for each virtual circuit, a memory location containing a set of data, referred to hereinafter as the context, defining conditions for evaluating the throughput of each virtual circuit, said context including a specified measurement interval duration and a number of cells already received, reading the context of a particular virtual circuit to which a particular cell belongs upon reception of said particular cell by an evaluation device, for the purpose of evaluating the throughput of said particular virtual circuit, using a clock signal to supply a current time associated with said particular virtual circuit, expressed in a determined unit, writing an indication of a start time of a measurement interval into said context for said particular virtual circuit, upon the arrival of said particular cell, and upon the arrival of a following cell for said particular virtual circuit, reading said context from the memory location assigned to said particular virtual circuit, subtracting said start time read from said context from a current time supplied by said clock signal to establish a time difference, upon reception of each cell, comparing said time difference and said measurement interval duration, incrementing said number of cells already received as long as said time difference is less than said measurement duration, supplying said number of cells already received as a measurement of a mean throughput of said particular virtual circuit, only when said time difference is equal to or greater than said measurement interval duration, while at the same time reinitializing said number of cells already received and the starting time of the measurement interval.

2. A method according to claim 1, further comprising the steps of:

writing an indication of a further starting time into said context for said particular virtual circuit upon arrival of a cell for said particular virtual circuit, upon the arrival of the next cell of the particular virtual circuit, reading said context at the memory location assigned to said particular virtual circuit, subtracting said further starting time supplied by the read context from the current time supplied by said clock signal to establish a second time difference constituting an instantaneous throughput measurement of said particular virtual circuit, defined as the time interval that has occurred between two cell arrivals, expressed in said determined unit, supplying said instantaneous throughput measurement to evaluation means, for determining excessive throughput, and recording said current time in the context as the further starting time.

3. A method according to claim 2, characterized in that the context includes a count of received cells incremented upon reception of each cell of the virtual circuit, after which the incremented count is compared with a specified count value and, only when said specified count value is reached by said received cell count, said second time difference is supplied as the instantaneous throughput measurement of the virtual circuit, while said received cell count is re-initialized.

4. A method according to claim 1, further comprising the step of accumulating several of said throughput measurements successively established for a given virtual circuit and for presenting the accumulated value as a measurement of an accumulated throughput.

5. A method according to claim 4, characterized in that the context includes at least one item of data constituting a throughput counter and that said method further comprises the steps of modifying the content thereof by adding the difference between a determined value corresponding to an authorized throughput, expressed in said determined unit, and one of said throughput measurements, and then comparing the value represented by said counter to a specified extreme value, and, if said extreme value is reached or exceeded, issuing a signal indicating excessive throughput.

6. A method according to claim 4, characterized in that several throughput thresholds are provided and a particular count value and that said method further comprises the steps of comparing one of said throughput measurements with these thresholds in order to determine within which interval between thresholds said measurement lies, and modifying said particular count value as a function of said determined interval, and further determining the arrival at an extreme value in a first direction of said particular count value in order to then supply a signal indicating excessive throughput.

7. A method according to claim 4 characterized in that said context includes at least one throughput threshold and that said method further comprises these steps of comparing one of said throughput measurements with this threshold and starting a throughput counter, in a first direction if this threshold is reached or exceeded, or in another direction if this threshold is not reached, as well as determining that said starting has brought the throughput counter to an extreme value of said first direction, and then supplying a signal indicating excessive throughput.

8. A method according to claim 6, characterized in that said context includes an indication of an authorized maximum throughput and that said method further comprises the steps of comparing, upon arrival of each cell, the measured throughput with said indication of maximum throughput, and, where said measured throughput reaches or exceeds the authorized maximum throughput, supplying said signal indicating excessive throughput.

9. A method according to claim 8, further comprising the steps of imposing a limiting throughput value on the throughput of said particular virtual circuit upon arrival at an extreme value of said particular count value, said limiting throughput value being dependent upon an associated throughput threshold, and comparing, upon arrival of each cell, the measured throughput with said limiting throughput value, and, where said measured throughput reaches or exceeds said limiting throughput value, supplying said signal indicating excessive throughput.

10. A device for evaluating the throughput of virtual circuits employing an asynchronous time-division multiplexed transmission channel, said device comprising:
a memory in which, for each virtual circuit, a memory location is assigned containing a set of data, referred to hereinafter as the context, defining conditions of evaluation of the throughput of each virtual circuit, said context including a specified measurement interval duration and a number of cells already received,
reading means for, upon reception of a particular cell, reading the context of a particular virtual circuit to which said particular cell belongs,
a clock signal source for supplying a current time associated with said particular virtual circuit, expressed in a determined unit,
writing means for writing an indication of a starting time of a time interval in said context of said particular virtual circuit, upon arrival of a cell for said particular virtual circuit,
further reading means for, upon arrival of a following cell for said particular virtual circuit, reading said context at the memory location assigned to said particular virtual circuit,
subtracting means for subtracting from a current time a starting time read from the context to establish a first time difference,
comparing means for comparing, upon reception of each cell, said time difference and said measurement interval duration,
incrementing means for the incrementing said number of cells already received, provided said time difference is less than said measurement interval duration,
supplying means for supplying said number of cells already received as a measurement of mean throughput of the virtual circuit, only when said time difference is equal to or greater than said measurement interval duration, and at the same time reinitializing said number of cells already received and the measurement interval starting time.

11. A device according to claim 10, characterized in that it includes:

means for writing a further starting time indication in said context for said particular virtual circuit, upon arrival of a cell for said particular virtual circuit,
means for, upon the arrival of a following cell for said particular virtual circuit, reading said context from the memory location assigned to said particular virtual circuit,
means for subtracting from the current time said further starting time to establish a second time difference constituting an instantaneous throughput measurement for the particular virtual circuit, defined as the time interval that has occurred between two cells,
means for supplying said instantaneous throughput measurement to evaluation means for determining excessive throughput, and
means for then writing said current time in said context as further starting time.

12. A device according to claim 11, characterized in that said context includes a received cell count and in that said device further comprises means for incrementing said received cell count upon reception of each cell for the particular virtual circuit, means for comparing the incremented count with a specified count value supplied by the context, and means that only operate when said specified count value is reached by said received cell count for supplying said second time difference as an instantaneous throughput measurement of the virtual circuit, defined as the time interval that has occurred between two nonconsecutive cells, while said received cell count is reinitialized.

13. A device according to claim 10, 11 or 12, characterized in that means are provided for accumulating several of said throughput measurements, successively established for a given virtual circuit, and for presenting them together as a measurement of accumulated throughput.

14. A device according to claim 13, characterized in that the context includes at least one throughput counter, and that said device further comprises means for modifying the content of said throughput counter by adding the difference between a determined value, corresponding to an authorized throughput, and one of said throughput measurements as well as means for comparing the value reached by said throughput counter with respect to a specified extreme value, and, if this extreme value is reached or exceeded, for issuing a signal indicating excessive throughput.

15. A device according to claim 13, characterized in that the context includes at least one throughput threshold and in that means are provided for comparing one of said throughput measurements with said threshold and means are provided for starting a throughput counter, in a first direction if this threshold is reached or exceeded, or in another direction if this threshold is not reached, means being furthermore provided for determining that said starting action has brought the throughput counter to an extreme value of said first direction, and then for supplying a signal indicating excessive throughput.

16. A device according to claim 13, characterized in that said context includes at least one item of data which is a particular count value, and also several throughput thresholds and that said device further includes means for comparing one of said throughput measurements with said thresholds in order to determine in which interval between thresholds said measurement lies and means for modifying said particular count value by an amount which is a function of said determined interval, as well as for determining arrival at an extreme value in a first direction of this particular count value, and then issuing a signal indicating excessive throughput.

17. A device according to claim 16, characterized in that the context includes an indication of a maximum authorized throughput and in that said device further comprises means for comparing, upon the arrival of each cell, the measured throughput with said indication of maximum throughput, and in the case where the measured throughput reaches or exceeds said authorized maximum throughput, for issuing said signal indicating excessive throughput.

18. A device according to claim 17, characterized in that it further comprises means for upon said throughput counter or said particular count value reaching said extreme value, writing into said context a limiting throughput value which depends on an associated throughput threshold, and for comparing, upon the arrival of each cell, the measured throughput with said limiting throughput value, and in the case where the measured throughput reaches or exceeds said limiting throughput value, for issuing said signal indicating excessive throughput.

19. A device according to claim 18, characterized in that said clock signal source supplies the current time associated with the virtual circuit via a clock selection module commanded by a clock signal selection indication supplied by said context of the virtual circuit and which selects, as a consequence, a group of outputs of a master clock, said group of outputs comprising a plurality of bits including a least significant bit output characterizing a determined unit which is used for measuring the durations involved in the throughput evaluations, this determined unit being selected in order to enable the desired degree of accuracy in these evaluations to be achieved.

* * * * *